(12) United States Patent
Mueck

(10) Patent No.: US 9,148,755 B2
(45) Date of Patent: Sep. 29, 2015

(54) MOBILE COMMUNICATION TERMINALS, METHOD FOR USING A COMMUNICATION SERVICE AND METHOD FOR DETERMINING INFORMATION RELATED TO A GEOGRAPHICAL POSITION OF A MOBILE COMMUNICATION TERMINAL

(75) Inventor: Markus Dominik Mueck, Unterhaching (DE)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

(21) Appl. No.: 13/977,033

(22) PCT Filed: Apr. 13, 2012

(86) PCT No.: PCT/EP2012/056833
§ 371 (c)(1),
(2), (4) Date: Jul. 9, 2013

(87) PCT Pub. No.: WO2013/152808
PCT Pub. Date: Oct. 17, 2013

(65) Prior Publication Data
US 2014/0200024 A1 Jul. 17, 2014

(51) Int. Cl.
*H04W 24/00* (2009.01)
*H04W 4/02* (2009.01)
*H04W 16/14* (2009.01)
*H04W 64/00* (2009.01)

(52) U.S. Cl.
CPC .............. *H04W 4/02* (2013.01); *H04W 16/14* (2013.01); *H04W 64/00* (2013.01)

(58) Field of Classification Search
CPC ....................................................... H04W 4/02
USPC ............ 455/405, 412.1, 412.2, 414.1, 414.2, 455/419, 420, 436, 435.1, 456.1, 550.1; 370/328, 329, 331, 338
See application file for complete search history.

(56) References Cited

U.S. PATENT DOCUMENTS

2007/0275730 A1* 11/2007 Bienas et al. ............... 455/456.1
2009/0061779 A1* 3/2009 Gurney et al. ............... 455/63.1

FOREIGN PATENT DOCUMENTS

| WO | 01/58098 A2 | 8/2001 |
|---|---|---|
| WO | 2005/034557 A1 | 4/2005 |
| WO | 2011/047694 A1 | 4/2011 |

OTHER PUBLICATIONS

Written Opinion of the International Searching Authority Received for PCT Application No. PCT/EP2012/056833, mailed on Sep. 24, 2012, 10 pages.
Celebi et al. "Utilization of Location Information in Cognitive Wireless Networks", IEEE Wireless Communications, IEEE Service Center, Piscataway, vol. 14, No. 4, Aug. 2007, pp. 6-13.

(Continued)

*Primary Examiner* — Babar Sarwar
(74) *Attorney, Agent, or Firm* — Schwabe, Williamson & Wyatt, P.C.

(57) ABSTRACT

According to an aspect of this disclosure, a mobile communication terminal is provided including determiner configured to determine a value of a parameter related to the mobile communication terminal and configured to determine an imprecision of the determined parameter value; and a controller configured to perform a setting for a communication service depending on the determined imprecision of the determined parameter value and to control the mobile communication terminal to use the communication service depending on the setting.

13 Claims, 11 Drawing Sheets

(56) References Cited

OTHER PUBLICATIONS

European Patent Office; International Search Report for PCT App. No. PCT/EP2012/056833 mailed Sep. 25, 2012; 6 pages.
Draft—Version of 22.12.11—Standardization Mandate to CEN, CENELEC and ETSI for a Software Defined Radio Architecture and for Certain Aspects of Cognitive Radio.
IETF PAWS; Data Model in Support of White Space Database Access Protocols; Taipei, Taiwan; Nov. 15, 2011.
John Malyar et al.; PAWS WG IETF-82; Device to Database Protocol for White Space; Nov. 2011; Telcordia Technologies, Inc.
International Bureau of WIPO; International Preliminary Report on Patentability for PCT App. No. PCT/EP2012/056833 mailed Oct. 23, 2014; 10 pages.

* cited by examiner

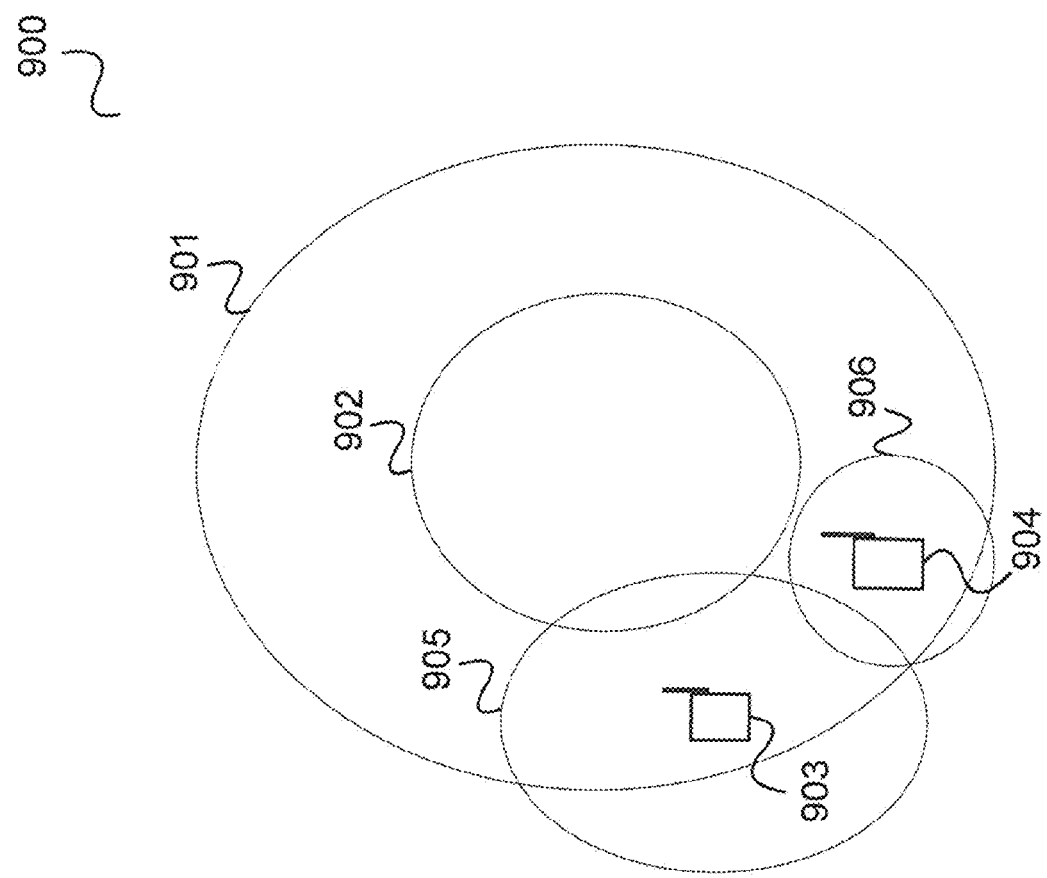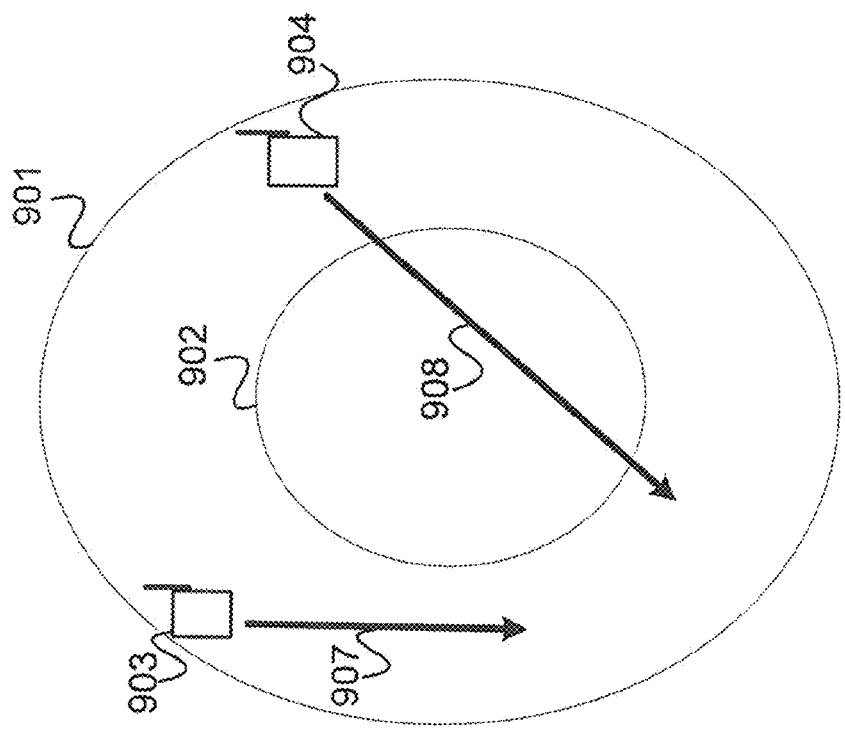
FIG 9

MOBILE COMMUNICATION TERMINALS, METHOD FOR USING A COMMUNICATION SERVICE AND METHOD FOR DETERMINING INFORMATION RELATED TO A GEOGRAPHICAL POSITION OF A MOBILE COMMUNICATION TERMINAL

RELATED APPLICATIONS

This application is a national stage entry according to 35 U.S.C. §371 of PCT application No. PCT/EP2012/056833 filed on Apr. 13, 2012.

TECHNICAL FIELD

Aspects of this disclosure generally relate to mobile communication terminals, methods for using a communication service and methods for determining information related to a geographical position of a mobile communication terminal.

BACKGROUND

The usage of communication services by a mobile communication terminal may depend on the location of the mobile communication terminal. For example, available communication resources (such as available white space frequency resources) may be location-dependent. Reliable approaches for performing settings for a communication service which are dependent on location or, generally, dependent on parameters related to the mobile terminal, are desirable.

SUMMARY

According to an aspect of this disclosure, a mobile communication terminal is provided including a determiner configured to determine a value of a parameter related to the mobile communication terminal and configured to determine an imprecision of the determined parameter value and a controller configured to perform a setting for a communication service depending on the determined imprecision of the determined parameter value and to control the mobile communication terminal to use the communication service depending on the setting.

According to another aspect of this disclosure, a mobile communication terminal is provided including a receiver configured to receive an indication of the geographical position of another mobile communication terminal and a determiner configured to determine information related to the geographical position of the mobile communication terminal based on the received indication of the geographical position of the other mobile communication terminal.

According to other aspects of this disclosure, methods according to the mobile communication terminals described above are provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various embodiments. In the following description, various aspects of this disclosure are described with reference to the following drawings, in which:

FIG. 9 illustrates location imprecision depending on the positioning approach used by a communication terminal.

DETAILED DESCRIPTION

Figure 1:
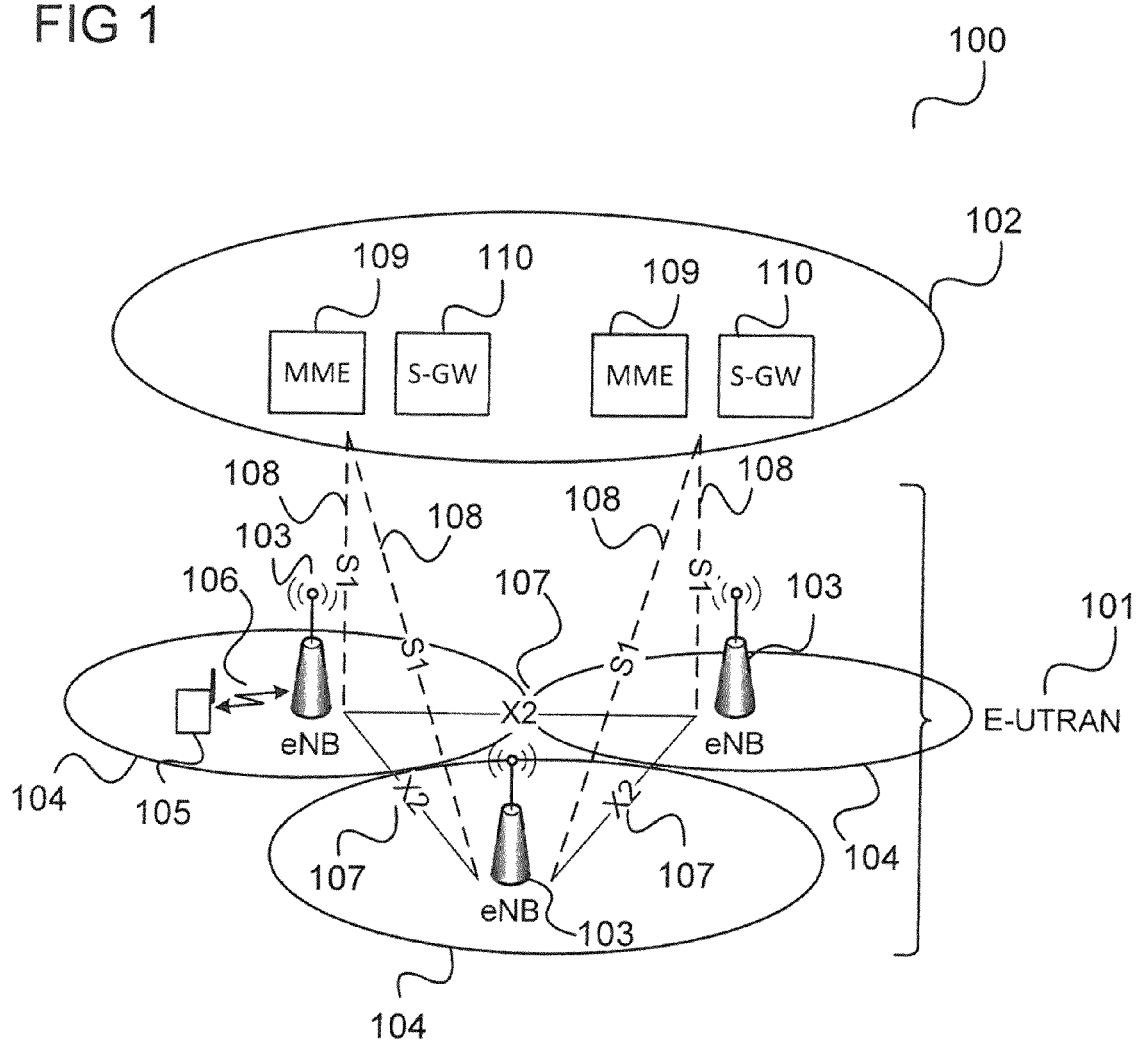
FIG. 1 shows a communication system according to an aspect of this disclosure.

The following detailed description refers to the accompanying drawings that show, by way of illustration, specific details and embodiments in which various embodiments may be practiced. These embodiments are described in sufficient detail to enable those skilled in the art to practice various embodiments. Other embodiments may be utilized and structural, logical, and electrical changes may be made without departing from the scope of various embodiments. The various embodiments are not necessarily mutually exclusive, as some embodiments can be combined with one or more other embodiments to form new embodiments.

The term "white spaces" is typically used in the context of the switching from analogue to digital TV (television). Since digital TV needs far less bandwidth due its increased spectral efficiency over the legacy analogue TV, large parts of the frequency band that is currently occupied by analogue TV can be reused by other systems. For this purpose, two approaches may be used:

- Some parts of the spectrum may be entirely re-assigned to other systems. For example, the spectrum 790-862 MHz (in Europe) or 698-790 MHz (in the US) is typically auctioned by national regulators. This part of the spectrum is typically referred to as "Digital Dividend".
- Some parts of the spectrum may be assigned to the newly introduced digital TV. Typically, this is the spectrum 470-790 MHz in Europe and between 54-698 MHz in the US (TV channels 2-51; however not all the spectrum between 54-698 MHz is available, there are some parts allocated to other systems, white spaces are only considered to be used for those parts that are actually allocated to TV). It can be expected, however, that the digital TV coverage may be low in some geographical regions. Therefore, a "secondary user" of a "secondary system", i.e. a device of another communication system than the TV broadcasting network, may be allowed to access these frequency bands if the "primary system", i.e. the TV broadcaster, is not using it. These (temporally, geographically) unused parts of the spectrum are referred to by "white spaces". It should be noted that the white spaces can also refer to other parts of the spectrum that are allocated to other systems than TV broadcast. Thus, the term white space can refer to any bands that are assigned to a primary user (such as any kind of communication system) and, if currently unused, can be used by a secondary user as described above for TV white spaces.

The idea of introducing white spaces for allowing unlicensed users to operate in licensed bands may be applied to other frequency bands than frequency bands allocated to TV broadcast. For example, according to the IEEE 802.11y standard, similar ideas may be applied to satellite bands.

According to one aspect of this disclosure, "white spaces" in cellular phone frequency bands, i.e. in frequency bands allocated to one or more cellular mobile communication systems, or, generally in frequency bands allocated to wireless bidirectional communication system, are used. This may provide a high amount of communication resources, since the geographic coverage of cellular phone access, i.e. of cellular mobile radio networks, such as UMTS (Universal Mobile Telecommunications System) communication networks, is still limited to key areas in the various countries. As long as an operator having licensed a part of the spectrum is not using this part of the spectrum, i.e. these frequency regions, in a certain geographical region, this part of the spectrum may be opened to other systems in this geographical region, e.g. for secondary spectrum usage, i.e. for usage of this part of the spectrum by other communication systems than the cellular communication network of this operator. According to one aspect of this disclosure, instead or in addition of using cellular phone bands for secondary spectrum usage as described above, a cellular communication network (e.g. a cellular phone system) may use TV white spaces as secondary user (i.e., a cellular system may act as a secondary user accessing non-cellular spectrum such as TV white spaces for cellular usage). In other words, a cellular communication network may be a primary user for cellular bands as well as a secondary user for TV white spaces. A joint usage by a cellular communication network of "traditional" licensed cellular bands (i.e. of frequency bands licensed for the cellular communication network) as a primary user and a secondary spectrum as a secondary user (e.g. TV spaces) is possible for example by using carrier aggregation. For example, two distinct bands (e.g., a licensed cellular band and a TV white space band) may be used simultaneously for LTE communication.

Various aspects of this disclosure are explained in the following with reference to an LTE (Long Term Evolution) cellular communication system as example for a wireless bidirectional communication system. A mobile terminal used according to aspects of this disclosure may also use other communication systems for communication (possibly using the white space spectrum, if it is available) such as WLAN (wireless local area network), WiFi, UMTS, GSM (Global System for Mobile Communications), Bluetooth etc.

FIG. 1 shows a communication system 100 according to an aspect of this disclosure.

According to this aspect of this disclosure, the communication system 100 is configured in accordance with the network architecture of LTE.

The communication system includes a radio access network (E-UTRAN, Evolved UMTS Terrestrial Radio Access Network) 101 and a core network (EPC, Evolved Packet Core) 102. The E-UTRAN 101 may include base (transceiver) stations (eNodeBs, eNBs) 103. Each base station 103 provides radio coverage for one or more mobile radio cells 104 of the E-UTRAN 101.

A mobile (communication) terminal (UE, user equipment) 105 located in a mobile radio cell 104 may communicate with the core network 102 and with other mobile terminals 105 via the base station providing coverage (in other words operating) the mobile radio cell.

Control and user data are transmitted between a base station 103 and a mobile terminal located in the mobile radio cell 104 operated by the base station 103 over the air interface 106 on the basis of a multiple access method.

The base stations 103 are interconnected with each other by means of the X2 interface 107. The base stations are also connected by means of the S1 interface 108 to the core network (Evolved Packet Core) 102, more specifically to a MME (Mobility Management Entity) 109 and a Serving Gateway (S-GW) 110. The MME 109 is responsible for controlling the mobility of UEs located in the coverage area of E-UTRAN, while the S-GW 110 is responsible for handling the transmission of user data between mobile terminals 105 and core network 102.

In the framework of cognitive radio (CR), the opportunistic usage of spectrum is an application of key focus. In particular, the TV Spectrum (Europe: 470 MHz-790 MHz) is expected to be locally/temporally underused and thus it can be used by a secondary user (SU), such as the mobile terminal 105, e.g. for communicating with a base station 103, while the primary user (PU), in this case the TV broadcaster, is absent, i.e. is not using these white space frequencies. Depending on the location of the mobile terminal 105, a sub-set of the entire TV Spectrum may be available for secondary usage. This is illustrated in FIG. 2.

Figure 2:
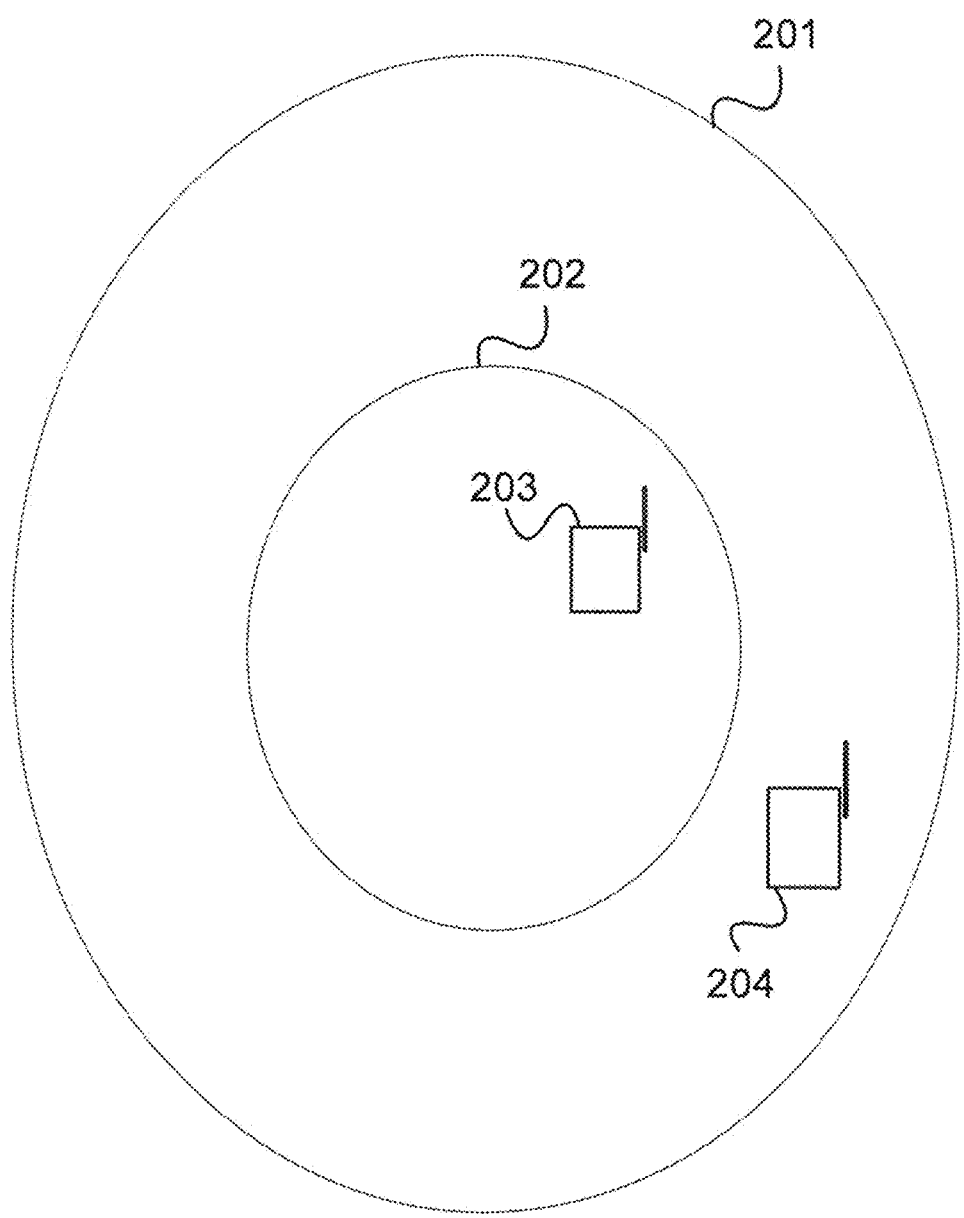
FIG. 2 shows an example for available white band frequencies depending on the location.

FIG. 2 shows an example for available white band frequencies depending on the location.

In this example, it is assumed that in a first geographical region 201 (in this example ellipse-shaped) a white space sub-spectrum S1 of an overall white space spectrum (e.g. a TV white space (TVWS) spectrum) may be used by a mobile terminal 203 located in the first geographical region.

Further, it is assumed that in a second geographical region 202 (in this example shaped as an elliptical-shaped ring around the first geographical region 201) a white space sub-spectrum S2 of the overall white space spectrum may be used by a mobile communication terminal 204 located in the second geographical region.

For example, outside the first geographical region 201 and the second geographical region 202, the mobile terminal may not use any parts of the white space spectrum.

As can be seen, in order to identify the subset of the white space spectrum (i.e. the sub-spectrum 201, 202) that is available for usage by a mobile communication terminal 203, 204, location information of the mobile communication terminal 203, 204 is required. However, location information available to a communication terminal 203, 204 may not be exact and thus there may be an uncertainty related to the applicable subset of the white space) spectrum to be used. This issue is illustrated in FIG. 3.

Figure 3:
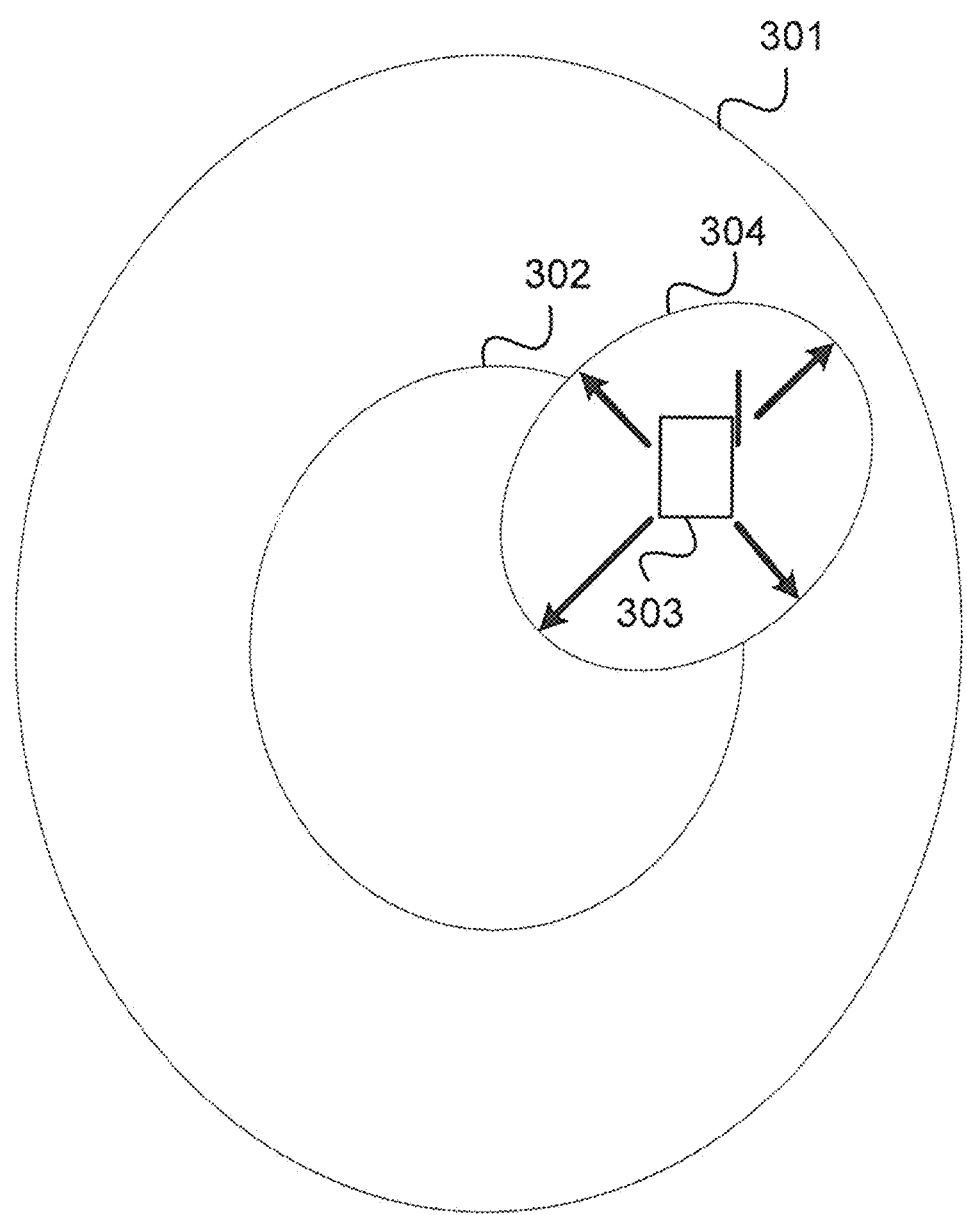
FIG. 3 illustrates location information imprecision in the context of the white space usage.

FIG. 3 illustrates location information imprecision in the context of the white space usage.

As in FIG. 2, it is assumed that in a first geographical region 301 a white space sub-spectrum S1 of an overall white space spectrum (e.g. a TV white space spectrum) may be used by mobile terminals located in the first geographical region and that in a second geographical region 302 a white space sub-spectrum S2 of the overall white space spectrum may be used by mobile terminals located in the second geographical region.

The location of a mobile terminal 303 may, as illustrated by an ellipse 304, only be known with a certain amount of imprecision such that it may not be determined (e.g. by the mobile terminal 303) whether the mobile terminal 303 may use the first sub-spectrum, the second sub-spectrum or neither.

Location imprecision related issues are not addressed in today's TVWS (or other white space) opportunistic spectrum usage systems. IETF PAWS ("Protocol to Access White Space database") for example currently defines a Protocol and Data Model for MDs accessing a database. By providing location information, a mobile terminal may get knowledge about the available sub-set of the white space spectrum that is available for secondary spectrum usage. IETF PAWS describes a corresponding data model requiring the mobile terminal to provide location information. However, it is inherently assumed that the location information is exact. Thus, issues related to imprecise location information are not considered.

Due to erroneous/imprecise location information, as illustrated in FIG. 3, a mobile terminal may be granted access to a white space spectrum that is not available for secondary usage at a given location. This may lead to unintended interference with a primary system.

According to various aspects of this disclosure, methods for improving the precision of an available location estimate for a given mobile terminal in case that one or more mobile terminals are available, methods for estimation of the precision of available location information in case that one or more neighboring mobile terminals are available and methods for determining an applicable white space sub-spectrum that is available for a given mobile terminal in case that information on the imprecision of the location information is available are provided.

Specifically, according to one aspect of this disclosure, a white space sub-spectrum available for a mobile terminal is determined based on information about the imprecision of a determined location (or geographical position) of the mobile terminal. However, it should be noted that aspects of this disclosure are not limited to the determination of an available white space sub-spectrum but may generally relate to a setting for a communication service (e.g. may relate to a specification of a spectrum to be used for the communication service or to a specification whether the communication service should be used at all). Further, the determination (or generally the setting) is not limited to being based on imprecision of the determination of a geographical position (i.e. location) of a mobile terminal but may also be based on the imprecision of a determined value of another parameter related to the mobile terminal such as a battery filling level of the mobile terminal or a network load etc.

Figure 4:
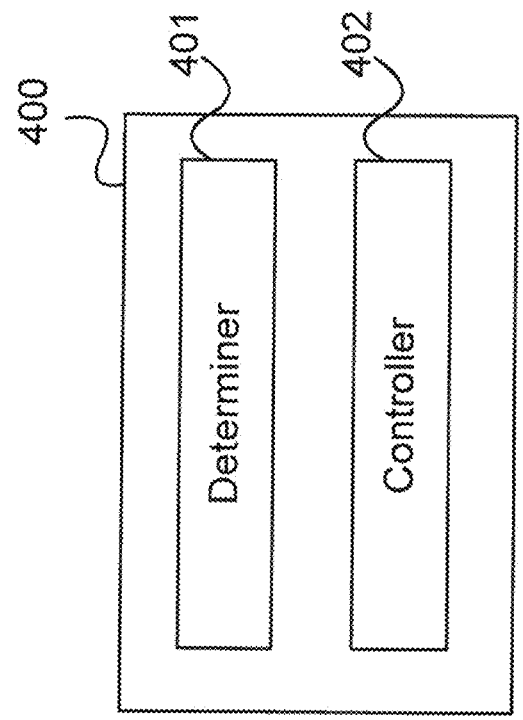
FIG. 4 shows mobile communication terminal according to an aspect of this disclosure.

FIG. 4 shows mobile communication terminal 400 according to an aspect of this disclosure.

The mobile communication terminal 400 includes a determiner 401 configured to determine a value of a parameter related to the mobile communication terminal and configured to determine an imprecision of the determined parameter value.

The mobile communication terminal 400 further includes a controller 402 configured to perform a setting for a communication service depending on the determined imprecision of the determined parameter value and to control the mobile communication terminal 400 to use the communication service depending on the setting.

According to one aspect of this disclosure, in other words, a communication terminal performs a setting depending on the possible variations/values (e.g. due to a lack of accuracy) of a determined parameter. In other words, a mobile terminal selects the correct settings for a communication service by taking into account the imprecision in the parameter determination (or, equivalently, the quality of the parameter determination). For example, the communication terminal may proceed according to a worst-case assumption and perform the setting such that it would be acceptable for all values of the parameter that would be possible in view of the imprecision and the determined parameter value (i.e. all the possible values of the parameter taking into account the imprecision). The communication service may be a communication connection. Accordingly, the setting for the communication service may be a setting for a communication connection. For example, the setting may specify communication resources to be used for the communication connection, e.g. whether white space spectrum should be used for the communication connection (or whether other frequency resources should be used).

The imprecision can for example be linked to a probability that the determined value of the parameter is correct or that the correct value is within a certain range of the determined value. For example, the imprecision may reflect that it may only be certain with a level of probability that the device is within a given area. In this context, the determined imprecision may be given by a statistical measure such as a variance, standard deviation, etc. for the determined parameter value and may thus for example specify the reliablity of the determined value and/or a range of uncertainty around the determined value.

The parameter for example describes a characteristic of the mobile communication terminal. For example, the parameter specifies the geographical position of the mobile communication terminal.

The communication service may be a communication service provided by a communication network and the parameter may describe a characteristic of the communication network.

The setting may for example specify whether the communication service should be used and controlling the mobile communication terminal to use the communication service depending on the setting may include controlling the mobile communication service to use the communication service if the setting specifies that the communication service should be used and to not use the communication service if the setting specifies that the communication service should not be used.

The setting may for example specify communication resources to be used for using the communication service and controlling the mobile communication terminal to use the communication service depending on the setting may include controlling the mobile communication terminal to use the communication service using the specified communication resources.

The setting may specifies whether the mobile communication terminal may use one or more white space frequency communication resources for the communication service and controlling the mobile communication terminal to use the communication service depending on the setting may include controlling the mobile communication terminal to use the communication service using the one or more white space frequency communication resources if the setting specifies that the mobile communication terminal may use the one or more white space frequency communication resources for the communication service and controlling the mobile communication terminal to not use the one or more white space frequency communication resources if the setting specifies that the mobile communication terminal may not use the one or more white space frequency communication resources.

The parameter value may be a geographical position of the mobile communication terminal and wherein performing the setting includes determining a set of white space frequency communication resources which are available for the mobile communication terminal for all geographical positions of the mobile communication terminal which may result from the determined geographical position and the determined imprecision and setting the frequency communication resources to be used for the communication service to the determined set.

The communication service is for example wireless communication.

The communication service is for example a location-based service.

Determining the parameter value and the imprecision of the determined parameter value may for example include determining a range of possible values for the parameter. The determined imprecision may thus be indicated by a range of possible values for the parameter. The information about this range may also include and/or be based on statistical or probability information. For example, the imprecision may be indicated as a range of possible values may be specified in which the correct value of the parameter lies with a certain probability. For another (e.g. higher) probability, another (e.g. bigger) range of possible values in which the correct value of the parameter lies with this probability may be determined as information about the imprecision.

Determining the imprecision of the determined parameter value may include determining a size of a region of possible values for the parameter.

According to one aspect of this disclosure, the parameter specifies the geographical position of the mobile communication terminal and wherein determining the imprecision of the determined parameter value includes receiving an indication of an estimated position of at least one other mobile communication terminal and determining the imprecision of the determined parameter value using the received indication.

The indication of the estimated position of the at least one other mobile communication terminal is for example received from the other communication terminal.

Figure 5:
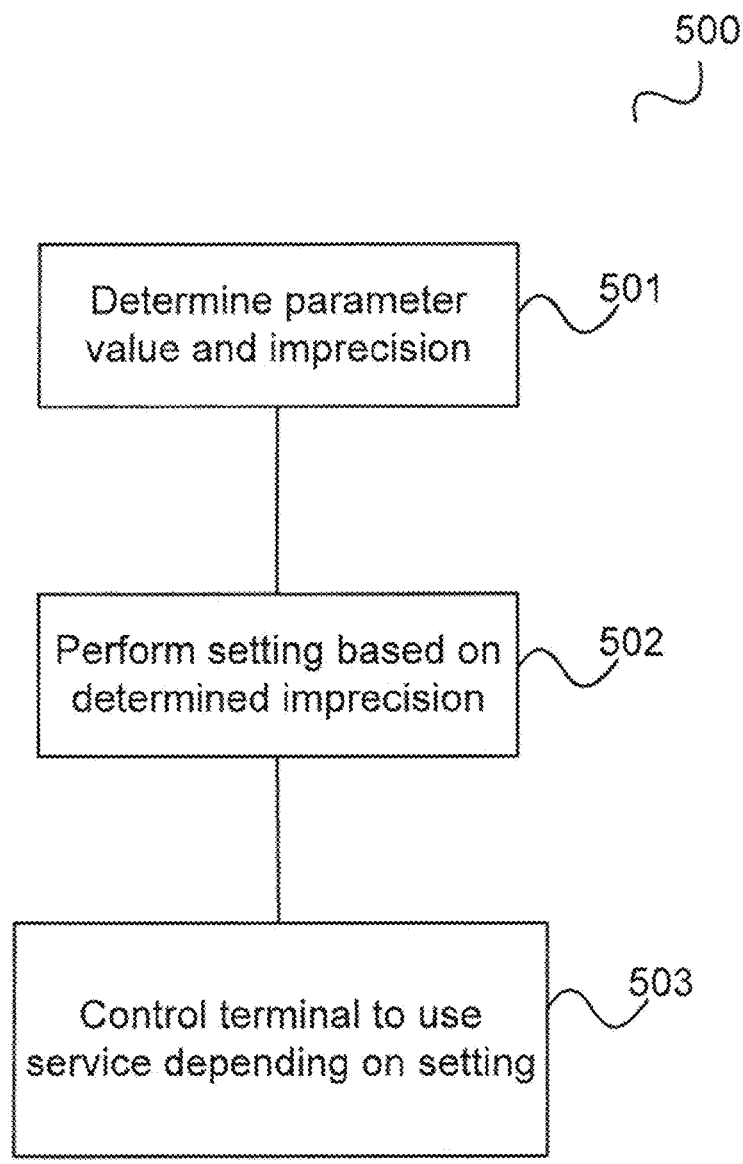
FIG. 5 shows a flow diagram according to an aspect of this disclosure.

The mobile communication terminal 400 for example carries out a method as illustrated in FIG. 5.

FIG. 5 shows a flow diagram 500 according to an aspect of this disclosure.

The flow diagram 500 illustrates a method for using a communication service.

In 501, a value of a parameter related to a mobile communication terminal and determining an imprecision of the determined parameter value are determined.

In 502, a setting for a communication service is performed depending on the determined imprecision of the determined parameter value.

In 503, the mobile communication terminal is controlled to use the communication service depending on the setting.

In case that the parameter is the location (or geographical position) of the mobile communication terminal information about this parameter may for example be based on information received from one or more other (e.g. neighboring) mobile terminals. This is illustrated in FIG. 6.

Figure 6:
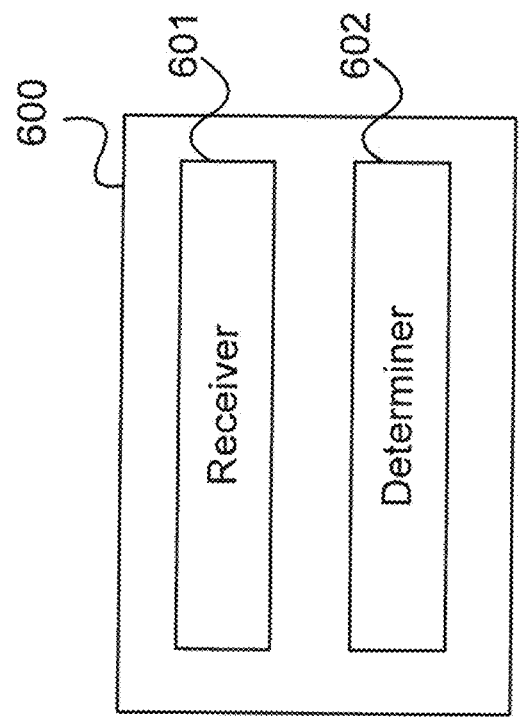
FIG. 6 shows a mobile communication terminal according to an aspect of this disclosure.

FIG. 6 shows a mobile communication terminal 600 according to an aspect of this disclosure.

The mobile communication terminal 600 includes a receiver 601 configured to receive an indication of the geographical position of another mobile communication terminal.

The mobile communication terminal 600 further includes a determiner 602 configured to determine information related to the geographical position of the mobile communication terminal 600 based on the received indication of the geographical position of the other mobile communication terminal.

According to one aspect of this disclosure, in other words, a mobile communication terminal receives information about a geographical position from another mobile communication terminal and uses this information to determine information related to (e.g. about) its own geographical position. For example the mobile communication terminal may estimate its own geographical position using the received information or determine the imprecision of an earlier determination of its geographical position.

The information about the geographical position may for example be an indication of the geographical position of the other mobile communication terminal.

The information related to the geographical position of the mobile communication terminal for example includes the geographical position of the mobile communication terminal.

The determiner may be configured to determine the geographical position of the mobile communication terminal and the information related to the geographical position may be the imprecision of the determined geographical position.

The mobile communication terminal for example further includes a transmitter configured to transmit a request for the indication of the geographical position of the other mobile communication terminal to the other mobile communication terminal.

The receiver is for example configured to receive the indication of the geographical position of the other mobile communication terminal from the other mobile communication terminal.

Figure 7:
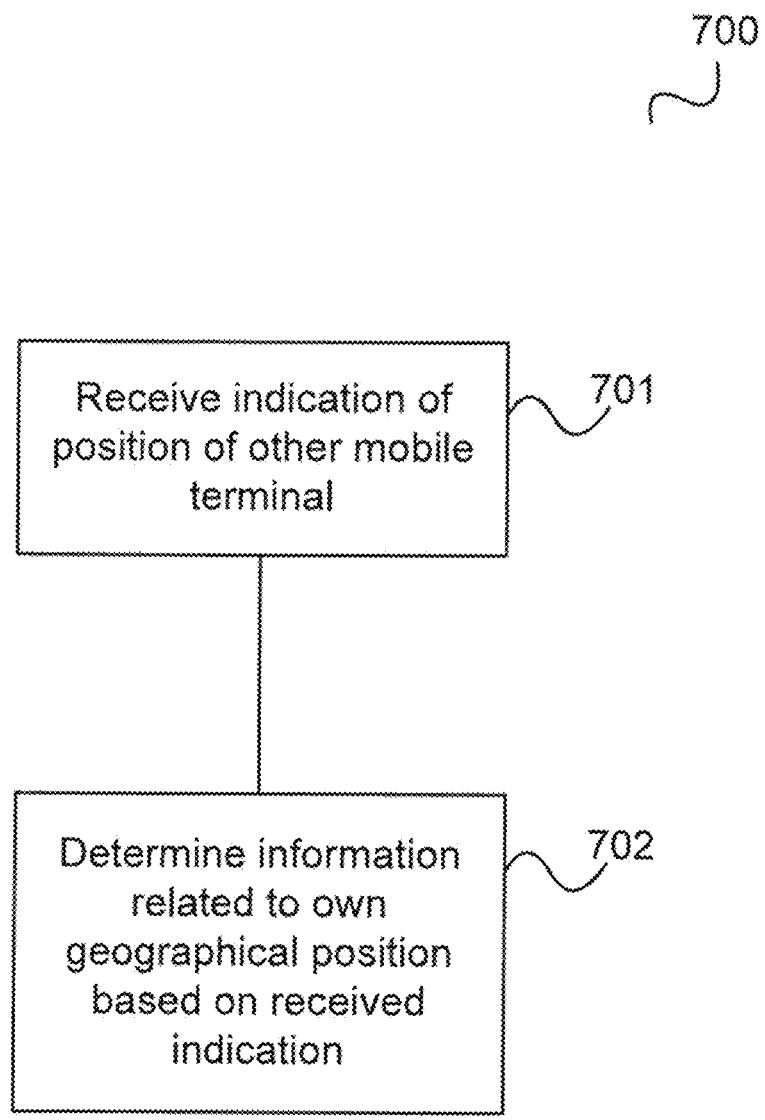
FIG. 7 shows a flow diagram according to an aspect of this disclosure.

The mobile communication terminal 600 for example carries out a method as illustrated in FIG. 7.

FIG. 7 shows a flow diagram 700 according to an aspect of this disclosure.

The flow diagram 700 illustrates a method for determining information related to a geographical position of a mobile communication terminal.

In 701, the mobile communication terminal receives an indication of the geographical position of another mobile communication terminal.

In 702 the mobile communication terminal determines information related to the geographical position of the mobile communication terminal based on the received indication of the geographical position of the other mobile communication terminal.

It should be noted that aspects described in context of one of the communication terminals 400, 500 are analogously valid for the other communication terminal 400, 500 and the methods illustrated in FIGS. 6 and 7 and vice versa.

The communication terminals 500, 600 may include a memory which is for example used in the processing carried out by the communication terminals 500, 600. A memory used may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

The various components of the communication terminals 500, 600 (e.g. determiners 401, 602 and controller 402) may for example be implemented by one or more circuits of the communication terminals 500, 600. A "circuit" may be understood as any kind of a logic implementing entity, which may be special purpose circuitry or a processor executing software stored in a memory, firmware, or any combination thereof. Thus, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative aspect of this disclosure.

In the following, aspects of this disclosure are described where the parameter which is determined is a geographical position of the communication terminal and the setting specifies the white space spectrum (if any) that should be used by the communication terminal. For determining the white space spectrum to be used, a mobile communication terminal typically needs to have information about its location which may be more or less accurate. According to one aspect of this disclosure, a mobile communication terminal improves the precision of an estimate of its location estimates in case that one or more neighboring communication terminals are available.

It is assumed that the mobile communication terminal from time to time obtains location information by measurements, e.g. based on GPS (Global Positioning System)/Galileo services, by triangulation exploiting available location information of cellular base stations etc. As an example, triangulation is illustrated in FIG. 8.

Figure 8:
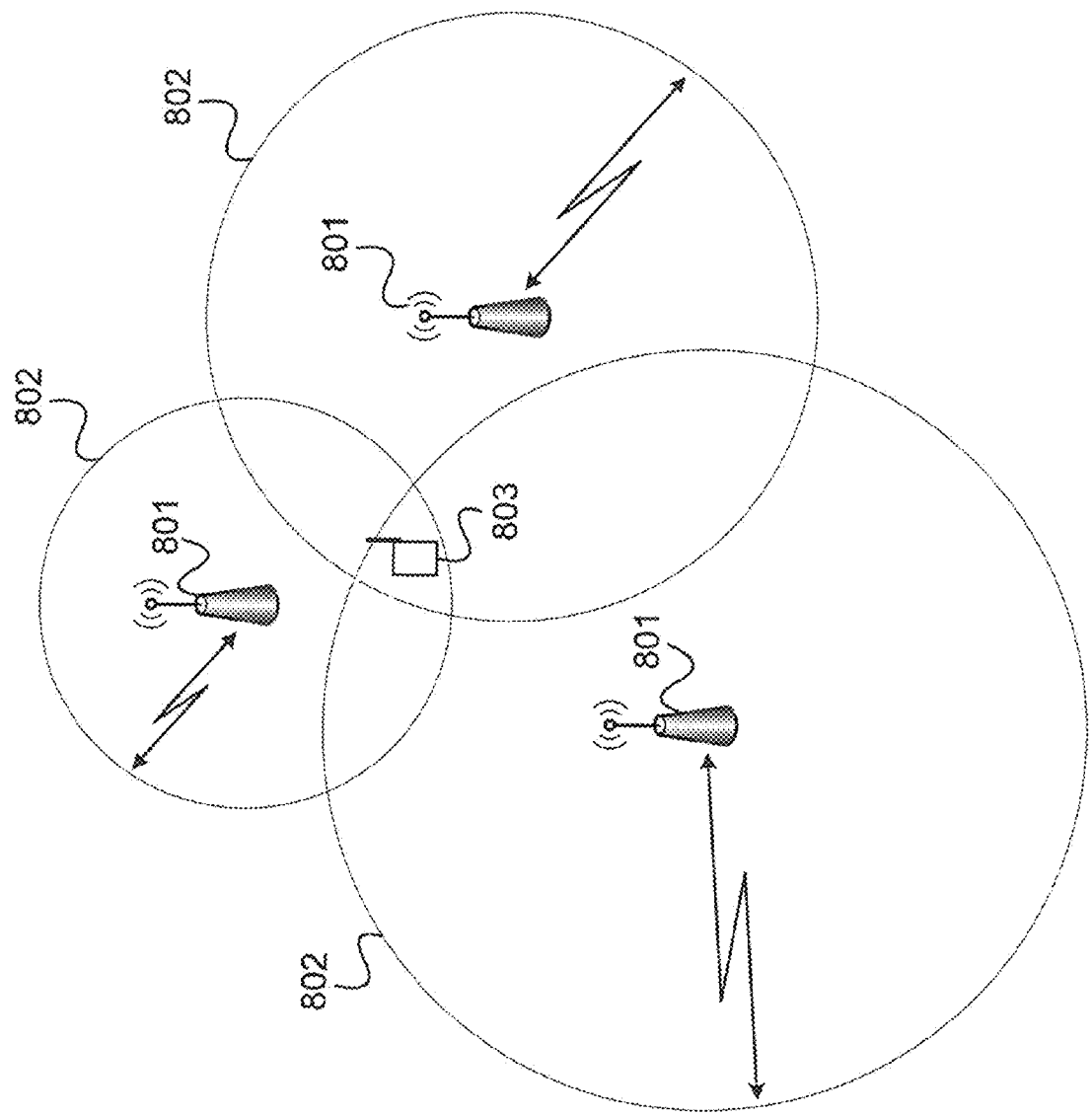
FIG. 8 shows a communication arrangement.

FIG. 8 shows a communication arrangement 800.

The communication arrangement 800 includes three base stations 801, for example corresponding to base stations 103. Based on the runtime of signals illustrated by circles 802 from the base station 801 a mobile communication terminal 803 (e.g. corresponding to the mobile communication terminal 105) may determine its geographical position.

Due to the inherent complexity and power consumption of positioning methods such as triangulation, it is typically desirable to repeat them only after larger intervals. Between those intervals, simpler methods for location determination (or none at all) may be employed. Simpler methods may for example include usage of accelerator-sensors based measurements which are exploited in order to update position information obtained from GPS/Galileo services, triangulation results, etc. Such updates can for example be determined using Kalman filtering approaches or similar approaches.

Depending on the positioning methods used and the frequency of the location determination, two neighboring mobile communication terminals may have location information of different quality available. This is illustrated in FIG. 9.

FIG. 9 illustrates location imprecision depending on the positioning approach used by a communication terminal.

The example of FIG. 9 is shown in context of the scenario of FIG. 2, i.e. it is assumed that in a first geographical region 901 a white space sub-spectrum 51 of an overall white space spectrum (e.g. a TV white space spectrum) may be used by mobile terminals located in the first geographical region and that in a second geographical region 902 a white space sub-spectrum S2 of the overall white space spectrum may be used by mobile terminals located in the second geographical region.

It is assumed that a first mobile communication terminal 903 determines its location at a first point in time (left part of FIG. 9) by triangulation and that a second mobile communication terminal 904 determines its location at the first point in time using a satellite positioning system (such as GPS or Galileo). It is further assumed that the first mobile communication terminal 903 moves in a first direction as illustrated by a first arrow 907 and the second mobile communication terminal 904 moves along a second direction as illustrated by a second arrow 908.

At a second point of time, as illustrated by the right part of FIG. 9, the mobile communication terminals 903 and 904 have arrived at new positions. It is assumed that the first communication terminal has not updated its position estimate since the first point in time. Accordingly, the location of the first mobile communication terminal 903 is, as illustrated by a first ellipse 905, only known with a certain (rather large) amount of imprecision. In contrast, it is assumed that the second communication terminal has updated its position estimate since the first point in time, e.g. by means of accelerator sensors and Kalman filtering. Accordingly, the location of the second mobile communication terminal 904 is, as illustrated by a second ellipse 906, is known with a smaller amount of imprecision than the location of the first mobile communication terminal 901.

According to one aspect of this disclosure, e.g. for two neighboring (i.e. close) mobile communication terminals, location information from the mobile communication terminal that has access to more precise location information (in this case the second mobile communication terminal 904) is transmitted to the mobile communication terminal that has less precise location information available (in this case the first mobile communication terminal 903). This can be carried out by communication via the communication network (e.g. E-UTRAN 101) or also via device-to-device communication.

Additionally, device-to-device communication techniques may be used including means to determine the relative location of communicating devices to each other, e.g. by measurements of transmission delay, signal strength or in other possible ways. As an additional step to more precise location estimation, the relative location of the mobile communication terminals may thus be taken into account.

In the following, an interaction between two mobile communication terminals is described with reference to FIG. 10.

Figure 10:
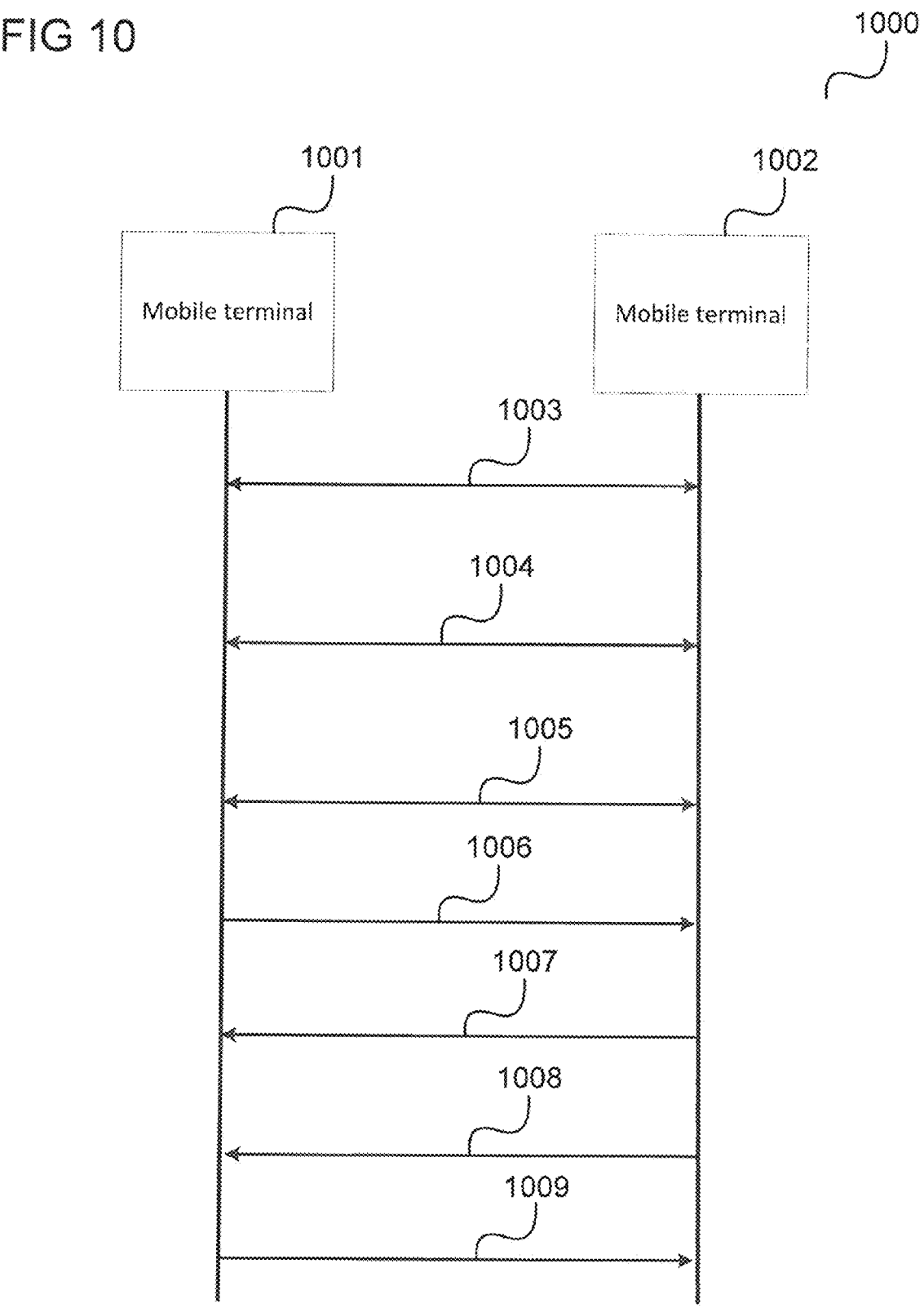
FIG. 10 shows a message flow diagram according to an aspect of this disclosure.

FIG. 10 shows a message flow diagram 1000 according to an aspect of this disclosure.

The message flow takes place between a first mobile terminal 1001 which is assumed to have information about its location with low precision (e.g. corresponding to the first mobile terminal 903) and a second mobile terminal 1002 which is assumed to have information about its location with high precision (e.g. corresponding to the second mobile terminal 904).

In 1003, the mobile terminals 1001, 1002 detect each other and establish device-to-device communication.

In 1004, the mobile terminals 1001, 1002, as initial communication, negotiate whether exchange/transfer of context information is possible. For example, each mobile terminal 1001, 1002 indicates whether it is able to share location information.

An indicative metric related to the precision of available location information may for example provided by each of the mobile terminals 1001, 1002.

If no device-to-device communication is possible (or desired), the data exchange may also be controlled by the network side, e.g. a (macro) base station 103. In this case, the base station can control the location information exchange between two mobile terminals 1001, 1002. Optionally, the base station can collect location information from various neighboring mobile terminals, process this information and provide resulting (possibly new) location estimates to some or more of the mobile terminals.

In 1005, the mobile terminals 1001, 1002 share (i.e. exchange) information about the precision of the available Location Information. Further, information may be exchanged related to how the location information was obtained and processed (e.g. obtained by GPS/triangulation/etc.), etc.

For example, each mobile terminal 1001, 1002 sends a message to the other mobile terminal 1001, 1002 including (e.g. in one or more data fields):

Information on the latest high-precision location estimation technique used (type such as GPS/Galileo determination, Triangulation, Information from other mobile terminal, etc.) and information on validity of the location information (e.g. time passed since last update, etc.)

If available: Information on refinement technique applied after latest high-precision location estimation (e.g., accelerator sensor information based Kalman Filtering, etc.) and information on validity (i.e., time passed since last update, precision of accelerator sensors, etc.)

If available: Information on estimated error bounds of currently available Location Information.

Based on the information on the location information available in the mobile terminals 1001, 1002, each mobile terminal 1001, 1002 can decide whether it makes sense to request the provision of the concerned information by the other device.

A mobile terminal 1001, 1002 may decide to request location information from the other mobile terminal 1001, 1002 for various reasons, for example:

In case that the mobile terminal has no location information estimation mechanism (such as a GPS module etc.) itself it may request the delivery of the location information from the other mobile terminal independent from the quality of the location estimates of the other mobile terminal.

In case that the other mobile terminal has more precise location information and the other mobile terminal is identified to be physically very close (i.e. through a very high field-strength of the received signal, etc.) by the mobile terminal, the mobile terminal may request the delivery of the more precise location information in order to replace the location information that is present in the mobile terminal itself Even if the location information of the other mobile terminal is less accurate compared to the location information available in the mobile terminal, it may be of value to request the information for the mobile terminal. For example, if the location information present in the other mobile terminal has been obtained by other means than the location information present in the mobile terminal an information fusion approach can be applied in order to further improve the precision of the location information within the mobile terminal.

In this example, it is assumed that both the first mobile communication terminal 1001 and the second mobile communication terminal 1002 decide to request location information from the respective other mobile communication terminal 1001, 1002.

In 1006, the first mobile terminal 1001 sends a request for Location information delivery (which may optionally include a request for details about how the location information was obtained) to the first mobile terminal 1001.

In 1007, the second mobile terminal 1002 delivers (at least a part of) the requested location information.

In 1008, the second mobile terminal 1002 sends a request for Location information delivery (which may optionally include a request for details about how the location information was obtained) to the second mobile terminal 1002.

In 1009, the first mobile terminal 1001 delivers (at least a part of) the requested location information.

According to one aspect of this disclosure, a mobile terminal may estimate the precision of available location information in case that one or more neighboring other mobile terminals (e.g. other mobile terminals in the vicinity of the mobile terminal) are available.

For example, two or more mobile terminals exchange available location estimates (e.g. using the message exchange as illustrated in FIG. 10) and then based on the location estimates, identify an estimated validity region.

Figure 11:
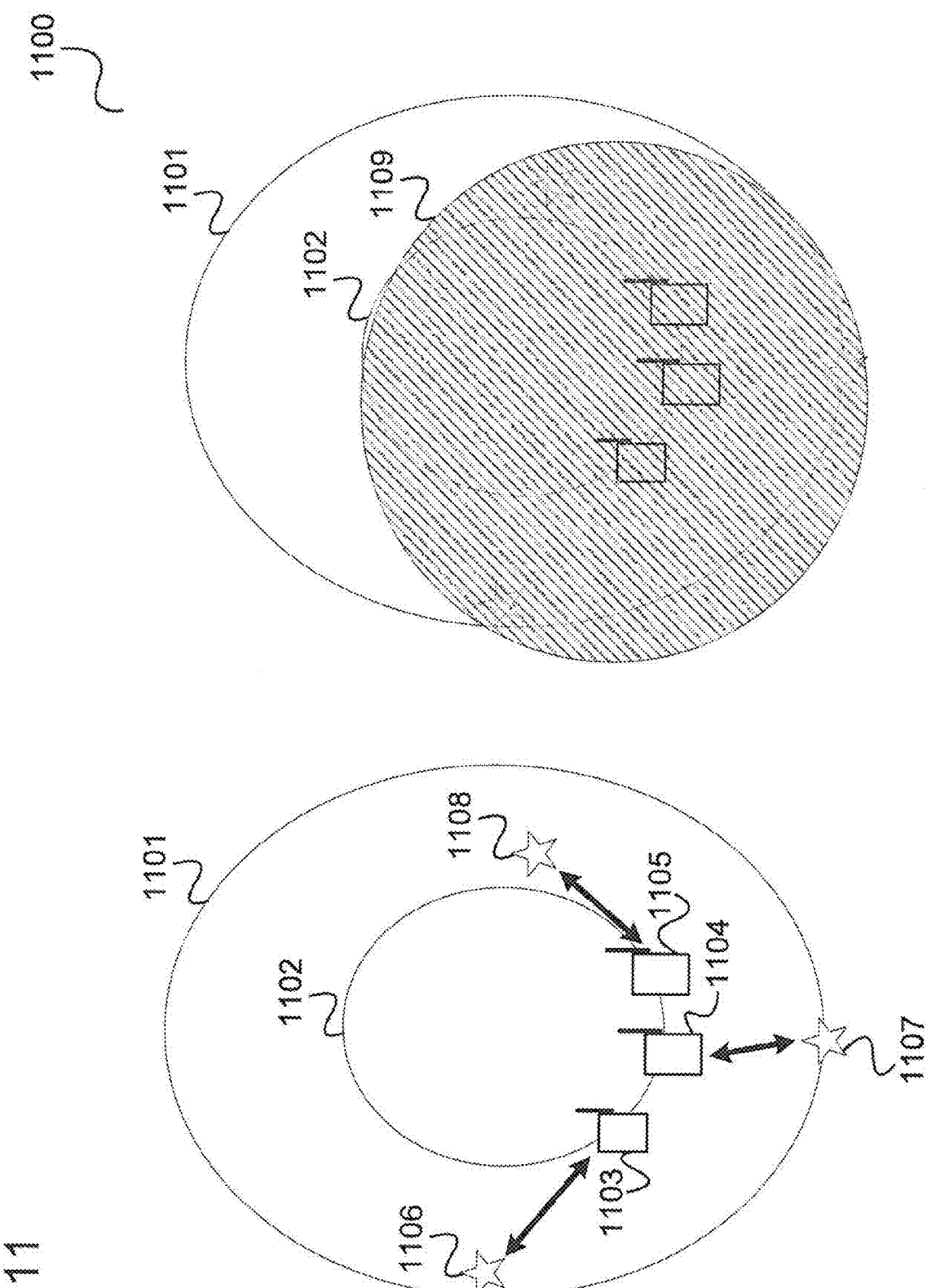
FIG. 11 illustrates the determination of a location estimate imprecision based on an exchange of location information between mobile terminals.

This is illustrated for the case of three mobile terminals in FIG. 11.

FIG. 11 illustrates the determination of a location estimate imprecision based on an exchange of location information between mobile terminals.

The example of FIG. 11 is shown in context of the scenario of FIG. 2, i.e. it is assumed that in a first geographical region 1101 a white space sub-spectrum S1 of an overall white space spectrum (e.g. a TV white space spectrum) may be used by mobile terminals located in the first geographical region and that in a second geographical region 1102 a white space sub-spectrum S2 of the overall white space spectrum may be used by mobile terminals located in the second geographical region.

As illustrated in the left part of FIG. 11 it is assumed that a first mobile terminal 1103 has determined a first location estimate (i.e. an estimate of its location) 1106, a second mobile terminal 1104 has determined a second location estimate 1107 and a third mobile terminal 1105 has determine a third location estimate 1108. In other words, it is assumed that each mobile terminal 1103, 1104, 1105 has an estimate of its location 1106, 1107, 1108 available.

According to one aspect of this disclosure, the first mobile terminal 1103, for example, acquires the location information from neighboring (i.e. close-by) mobile terminals. In this case the first mobile terminal 1003 acquires (e.g. requests and receives) the location estimates of the second mobile terminal 1104 and the third mobile terminal 1105 from the second mobile terminal 1104 and the third mobile terminal 1105.

From this information, the first mobile terminal 1103 determines the imprecision of its own location estimate, for example as follows and as illustrated in the right part of FIG. 11. This is for example done in reaction to the first mobile terminal 1103 has detecting that the second mobile terminal 1104 and the third mobile terminal 1105 are located close to its own position. The first mobile terminal 1103 determines the smallest circle (or other geometrical shape, e.g. a square or rectangle) 1109 possible such that all location estimates 1106, 1107, 1108 are on the border of the circle or within the circle.

This resulting circle 1109 may be used as the estimated "true location range" of the first mobile terminal 1103 and can be seen to give an indication on the precision of the available location information.

In case the mobile terminals 1103, 1104, 1105 deliver location information of distinct quality/precision, it is possible to deal with them in different ways, for example
  use only the most precise estimates provided by the mobile terminals 1103, 1104, 1105,
  weigh the "importance" of estimates depending on the inherent precision and thus take into account the location estimates in a weighted way for the derivation of the "true location range",
  scale the size of the resulting circle 1109, for example by a factor higher than 1, taking further possible imprecision of the estimates into account.

A mobile terminal may also use other approaches for determining the imprecision of a determination of its location than based on information from one or more other mobile terminals as explained with reference to FIG. 11. For example, the mobile terminal may derive the imprecision of its location estimate from a known imprecision of the positioning mechanism used or a measurement error probability of the positioning mechanism used. For example, if with a satellite positioning system, a location may only be determined up to 10 meters of accuracy, the mobile terminal may use this as the imprecision. The mobile terminal may also derive the imprecision based on the time since the determination of the location, possibly taking into account its velocity (for example determined with the help of an acceleration sensor). For example, as illustrated in FIG. 9, a mobile terminal may increase the region of possible locations (as in the case of the first ellipse 905) over time, depending on an estimate of its velocity.

Having determined the imprecision of the determination of its location, for example as described with reference to FIG. 11 or based on any other approach, the mobile terminal may perform a setting (in other words set an operating parameter) for a communication service. In the case of white space usage, the communication service may be wireless communication and the setting may specify which frequency resources should be used for the wireless communication.

For example, in the scenario of FIG. 11, the available subset (S1 or S2) of the white space spectrum that is available to a mobile terminal 1103, 1104, 1105 may be determined as follows:

If the resulting circle 1109 is included in the first region 1101 that is allowing the usage of the subset S1 of the white space spectrum, then the mobile terminal 1103, 1104, 1105 is able to use this subset S1.

If the resulting circle 1109 is included in the second region 1101 that is allowing the usage of the subset S2 of the white space spectrum, then the mobile terminal 1103, 1104, 1105 is able to use this subset S2.

If the resulting circle 1109 covers parts of the first region 1101 and the second region 1102 which are allowing the usage of different subsets S1 and S2, then the mobile terminal 1103, 1104, 1105 may only use common elements of these subsets, i.e. S1 ∩ S2 in the given example.

If the resulting circle covers an area where no white space spectrum is available (e.g. extends beyond the first region 1101 and the second region 1102), then the mobile terminal 1103, 1104, 1105 may not use any white space spectrum.

Thus, the decision about the available white space subset for the mobile terminal 1103, 1104, 1105 is made not only on a single location but on a location area (corresponding to a location estimate imprecision), for example derived from one or more location measurements in one or more other mobile terminals 1103, 1104, 1105 in proximity and their estimated location estimate precision or measurement error probability.

While various embodiments have been particularly shown and described with reference to specific aspects, it should be understood by those skilled in the art that various changes in form and detail may be made therein without departing from the spirit and scope of various embodiments as defined by the appended claims. The scope of various embodiments is thus indicated by the appended claims and all changes which come within the meaning and range of equivalency of the claims are therefore intended to be embraced.

What is claimed is:

1. A mobile communication terminal comprising:
   a determiner to:
      determine a value of a parameter that specifies a geographical position of the mobile communication terminal;
      receive, from another mobile communication terminal, an indication of an estimated position of the other mobile communication terminal; and
      determine an imprecision of the determined value based on the received indication; and
   a controller to perform a setting for a communication service depending on the determined imprecision of the determined value and to control the mobile communication terminal to use the communication service depending on the setting,
   wherein: the setting is to identify one or more white space frequency communication resources that the mobile communication terminal can use for the communication service; the received indication is a first indication; and the determiner is further to:
      receive a second indication, from the other mobile communication terminal, of an estimation procedure employed to determine the estimated position of the other mobile communication terminal;
      receive indications of estimated positions and estimation procedures from a plurality of mobile communication terminals; and
      determine the imprecision of the determined value based on the received indications.

2. The mobile communication terminal of claim 1, wherein the communication service is a communication service provided by a communication network and the parameter describes a characteristic of the communication network.

3. The mobile communication terminal of claim 1, wherein the setting specifies whether the communication service is to be used and controlling the mobile communication terminal to use the communication service depending on the setting comprises controlling the mobile communication service to use the communication service if the setting specifies that the communication service is to be used and to not use the communication service if the setting specifies that the communication service is not to be used.

4. The mobile communication terminal of claim 1, wherein the determiner is to adjust the value based on the received indication.

5. The mobile communication terminal of claim 1, wherein performing the setting includes determining a set of white space frequency communication resources that are available for the mobile communication terminal for all geographical positions of the mobile communication terminal that result from the determined geographical position and the determined imprecision and setting the frequency communication resources to be used for the communication service to the determined set.

6. The mobile communication terminal of claim 1, wherein the communication service is wireless communication.

7. The mobile communication terminal of claim 1, wherein the communication service is a location-based service.

8. The mobile communication terminal of claim 1, wherein determining the parameter value and the imprecision of the determined parameter value comprises determining a range of possible values for the parameter.

9. The mobile communication terminal of claim 1, wherein determining the imprecision of the determined parameter value comprises determining a size of a region of possible values for the parameter.

10. A method for using a communication service comprising:
- determining a value of a parameter that specifies the geographical position of a mobile communication terminal;
- receiving, from a first mobile communication terminal, indications of estimated position of the first mobile communication terminal and estimation procedures employed to determine the estimated position of the first mobile communication terminal;
- receiving, from a second mobile communication terminal, indications of estimated position of the second mobile communication terminal and estimation procedures employed to determine the estimated position of the second mobile communication terminal;
- determining an imprecision of the determined value based on the received indications from the first mobile communication terminal and the second mobile communication terminal;
- performing a setting for a communication service depending on the determined imprecision of the determined value; and
- controlling the mobile communication terminal to use one or more white space frequency communication resources for the communication service depending on the setting.

11. One or more non-transitory computer-readable media having instructions that, when executed by one or more processors, cause a mobile communication terminal to:
- determine a value of a parameter that specifies the geographical position of the mobile communication terminal;
- receive, from a first mobile communication terminal, indications of estimated position of the first mobile communication terminal and estimation procedures employed to determine the estimated position of the first mobile communication terminal;
- receive, from a second mobile communication terminal, indications of estimated position of the second mobile communication terminal and estimation procedures employed to determine the estimated position of the second mobile communication terminal;
- determine an imprecision of the determined value based on the received indications from the first mobile communication terminal and the second mobile communication terminal;
- perform a setting for a communication service depending on the determined imprecision of the determined value; and
- control the mobile communication terminal to use one or more white space frequency communication resources for the communication service depending on the setting.

12. The one or more non-transitory computer-readable media of claim 11, wherein the instructions, when executed by the one or more processors, further cause the mobile communication terminal to:
- adjust the value based on the received indication.

13. The one or more non-transitory computer-readable media of claim 11, wherein the one or more white space frequency communication resources are one or more subsets of a television white space spectrum.

\* \* \* \* \*